(12) United States Patent
Arikawa et al.

(10) Patent No.: US 6,298,028 B1
(45) Date of Patent: Oct. 2, 2001

(54) OPTICAL HEAD AND INFORMATION RECORDING AND REPRODUCING APPARATUS USING IT

(75) Inventors: Kouji Arikawa, Hitachinaka; Shigeru Nakamura, Tachikawa; Kazuo Shigematsu, Yoshikawa, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/520,722

(22) Filed: Mar. 8, 2000

(30) Foreign Application Priority Data

Dec. 27, 1999 (JP) .................................................. 11-369139

(51) Int. Cl.[7] ....................................................... G11B 7/12
(52) U.S. Cl. .................. 369/112.22; 369/166; 369/44.37
(58) Field of Search ........................... 369/47.1, 53.1, 369/53.11, 44.23, 44.14, 44.12, 44.27, 44.37, 44.38, 44.41, 108, 112.01, 112.22, 116, 121

(56) References Cited

U.S. PATENT DOCUMENTS 6,009,066 * 12/1999 Yoo et al. .......................... 369/112.1
6,222,801 * 4/2001 Yoo et al. .......................... 369/44.23

* cited by examiner

*Primary Examiner*—Muhammad Edun
(74) *Attorney, Agent, or Firm*—Antonelli, Terry, Stout & Krasu, LLP (57) ABSTRACT

In an optical head for recording on or reproducing from a plurality of kinds of optical information recording media corresponding to a plurality of kinds of different wavelengths, coma aberration is prevented, and low price and high reliability are realized. To that end, in an optical head constituted by laser light sources of three wavelengths and photodetectors corresponding to the laser light sources of the three wavelengths, a two-laser module including laser light sources of two adjacent wavelengths and photodetectors corresponding to the laser light sources, a laser module including a laser light source of the rest one wavelength and a photodetector corresponding to the laser light source, and a dichroic mirror bonded with a rising mirror are combined.

8 Claims, 5 Drawing Sheets

OPTICAL HEAD AND INFORMATION RECORDING AND REPRODUCING APPARATUS USING IT

CROSS-REFERENCE TO RELATED APPLICATION

The present application relates to subject matter described in application Ser. No. 09/517,594 filed Mar. 3, 2000 entitled "OPTICAL HEAD AND OPTICAL INFORMATION MEDIA RECORDING/REPRODUCTION APPARATUS USING THE SAME", the disclosure of which is hereby incorporated by reference.

BACKGROUND OF THE INVENTION

The present invention relates to a laser module for optical information processing to record or read information recorded onto an optical recording medium such as an optical disc, a photomagnetic disc, or the like, with laser light, and particularly relates to a laser module for dealing with a plurality of wavelengths for the combination of DVD and CD or the like, an optical head and an optical information recording and reproducing apparatus using it.

Recently, a DVD (Digital Versatile Disc) drive using laser light having a wavelength of 650 nm has come into a wide use rapidly as a dual-wavelength drive which is also applicable to CD using laser light having a wavelength of 780 nm. In an optical head used in this drive, semiconductor lasers, collimating lenses, objective lenses, photodetector, etc. are mounted for the respective CD and DVD in order to keep compatibility between DVD and CD. As a result, the number of parts is doubled, and their optical adjustment is complicated, so that the cost increases.

On the other hand, a blue laser having a wavelength of 410 nm has been lively developed, and expected to be put into practical use in the near future. It is therefore necessary to develop a three-wavelength optical head which can also deal with a blue laser while keeping compatibility with CD and DVD. However, preparing and assembling parts for the three wavelengths causes not only a large increase in the cost but also a serious problem in downsizing of the optical head and in ensurance of reliability.

Figure 5:
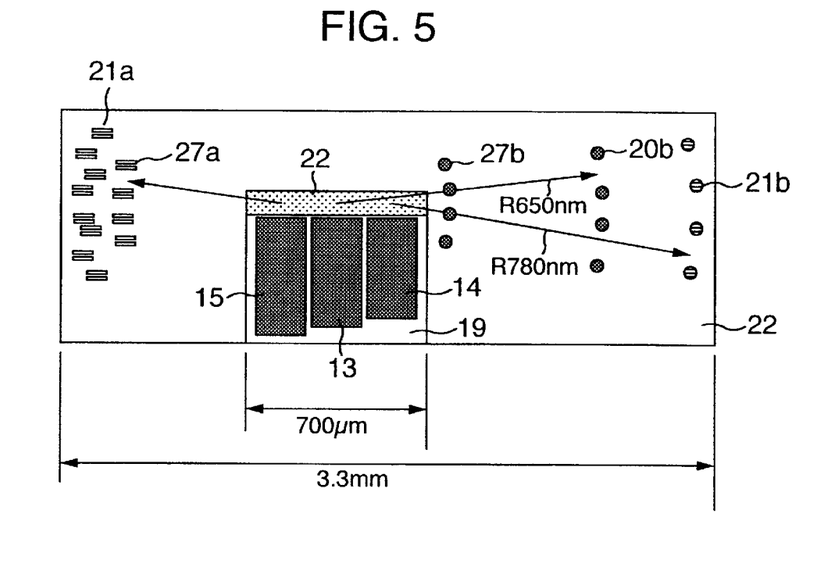
FIG. 5 is a plan view showing a structure of a three-laser module having three wavelengths, as a reference example.

As a technique for miniaturizing such a three-wavelength optical head and ensuring its reliability, JP-A10-21577 discloses an example of a three-laser module in which three semiconductor laser chips are pasted on a silicon substrate having micro-mirrors and photodetectors, and formed into a module. However, when a deflection/diffraction grating is used in common, a photodetector portion for dealing with the three wavelengths spreads over a wide area. As a result, there occurs a problem that the silicon substrate is made large in size so that the cost is increased. For example, FIG. 5 shows a state of a silicon substrate in which three laser chips each having a chip width of 0.25 mm are arranged. A recess portion on the silicon substrate for arranging the chips therein (hereinafter, referred to as "sink portion") is 1.1 mm wide, and focusing and tracking photodetectors corresponding to the respective lasers are disposed on opposite sides of the sink portion. Finally, the width of the silicon substrate reaches 3.9 mm, which is, for example, approximately twice as large as the width of a silicon substrate currently used in a laser module for CD. JP-A-11-134702 disclose a three-wavelength diode for oscillating three-wavelength laser light as a technology corresponding to three-wavelength optical head, and an example for introducing three-wavelength laser light into a common photodetector by using deflector/diffraction grating. However in this situation, two out of three-wavelength are incident into converging optical system in a slanted manner inviting coma aberration.

SUMMARY OF THE INVENTION

To solve the foregoing problems, the present invention provides an optical head comprising a plurality of laser light sources and a plurality of photodetectors corresponding to said plurality of laser light sources. The plurality of laser light sources have three kinds of wavelengths A, B and C (A>B>C), and include first and second laser modules. The first laser module includes laser light sources having the wavelengths A and B and two photodetectors corresponding to the laser light sources having the wavelengths A and B. The second laser module includes a laser light source having the wavelength C and a photodetector corresponding to the laser light source having the wavelength C. Laser light emitted from each laser light source of the first laser module is introduced to an optical information medium through reflection (or transmission) by a wavelength filter. Reflected light from the optical information medium is introduced to the photodetectors of the first laser module. Laser light emitted from the laser light source of the second laser module is introduced to the optical information medium through reflection (or transmission) by the wavelength filter. Reflected light from the optical information medium is introduced to the photodetectors of the second laser module.

Further, in the above-mentioned optical head, a collimating lens, a rise-up mirror and a focus lens are provided as focusing means between the wavelength filter and the optical information medium. In addition, a dichroic mirror is put on a surface of said rise-up mirror, so that light of the wavelength A is transmitted through the dichroic mirror and reflected by a surface of the rising mirror, while light of the wavelength B is reflected by the dichroic mirror.

In addition, the present invention provides an optical head having first and second laser modules. The first laser module includes laser light sources having the wavelengths B and C and two photodetectors corresponding to the laser light sources having the wavelengths B and C. The second laser module including a laser light source having the wavelength A and a photodetector corresponding to the laser light source having the wavelength A. Laser light emitted from each laser light source of the first laser module is introduced to an optical information medium through reflection (or transmission) by a wavelength filter. Reflected light from the optical information medium is introduced to the photodetectors of the first laser module. Laser light emitted from the laser light source of the second laser module is introduced to the optical information medium through reflection (or transmission) by the wavelength filter. Reflected light from the optical information medium is introduced to the photodetector of the second laser module.

Further, in the above-mentioned optical head, a collimating lens, a rise-up mirror and a focus lens are provided as focusing means between the wavelength filter and the optical information medium. In addition, a dichroic mirror is put on a surface of said rise-up mirror, so that light of the wavelength B is transmitted through the dichroic mirror and reflected by a surface of the rise-up mirror, while light of the wavelength C is reflected by the dichroic mirror.

Further, in any one of the above-mentioned optical heads, a beam shaping prism is disposed between the second laser module and the wavelength filter.

In addition, the present invention provides an optical information recording and reproducing apparatus comprising any one of the above-mentioned optical head, optical information medium judging means, and light source selecting means. One is selected from the above-mentioned laser light sources by the light source selecting means on the basis of the result of judgement by the optical information medium judging means.

DESCRIPTION OF THE EMBODIMENTS

Figure 1:
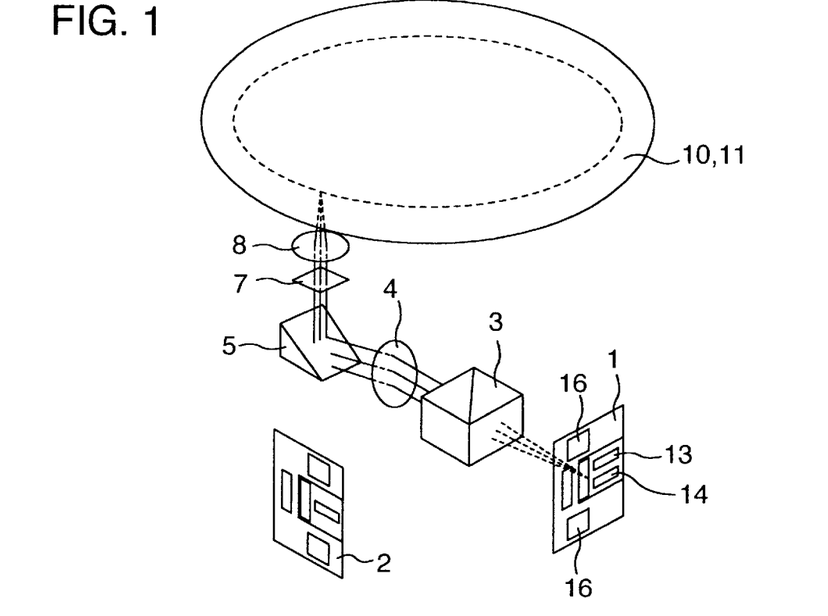
FIG. 1 is a view showing an optical path for DVD in a first configuration example of an optical head according to the present invention.
Figure 2:
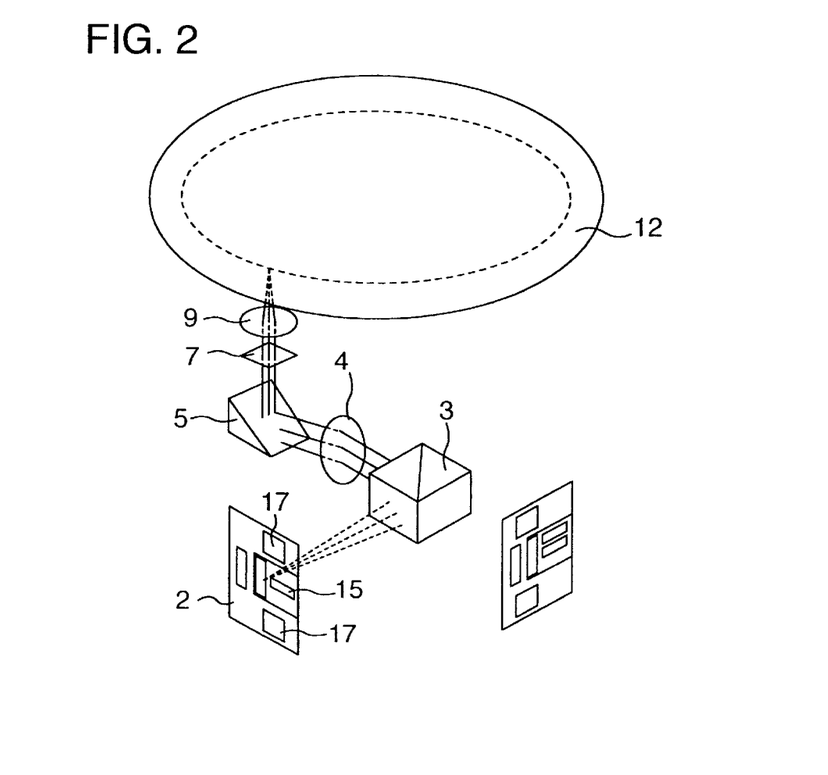
FIG. 2 is a view showing an optical path for high density DVD in the first configuration example of the optical head according to the present invention.

FIGS. 1 and 2 show a first configuration example of an optical head according to the present invention. FIG. 1 shows an optical path of a laser from a laser chip to a disc in reproducing or recording/reproducing of DVD-ROM or DVD-RAM (wavelength: 650 nm) and CD or CD-R (wavelength: 780 nm). FIG. 2 shows an optical path of a laser from a laser chip to a disc in reproducing or recording/reproducing of high-density DVD (wavelength: 410 nm).

In FIG. 1, when the optical head is used for DVD-ROM or DVD-RAM, laser light emitted from a 650 nm wavelength semiconductor laser chip 13 in a first laser module 1 is transmitted through a wavelength filter 3, then collimated into parallel rays by a collimating lens 4, reflected by a rising mirror 5, and thereafter condensed on a recording surface of a 0.6 mm thick DVD optical disc 10 by a focus lens 8. Then, the reflected light from the optical disc 10 is passed through the focus lens 8 and made into linear diffracted light by a deflection/diffraction grating 7. The diffracted light is passed through the collimating lens 4 and the wavelength filter 3, and converted into electric signals by light receiving elements 16 provided in the laser module 1.

On the other hand, when the optical head is used for CD or CD-R, laser light emitted from a 780 nm wavelength semiconductor laser chip 14 in the first laser module 1 is passed through the wavelength filter 3 and the collimating lens 4, reflected by the rise-up mirror 5, and thereafter condensed on a 1.2 mm thick CD optical disc 11 by the focus lens 8, in the same manner as in the case of DVD. Here, focus correction based on a difference in thickness between DVD and CD is performed by the focus lens.

In the case of high-density DVD (wavelength: 410 nm) in FIG. 2, laser light emitted from a 410 nm wavelength semiconductor laser chip 15 in a second laser module 2 is set to take the same optical axis as that of the laser light of DVD shown in FIG. 1 after the laser light is reflected by the wavelength filter 3. The laser light is passed through the collimating lens 4 and the rise-up mirror 5, and condensed on a high-density DVD optical disc 12 by use of a special focus lens 9. Reflected light from the optical disc 12 is passed through the focus lens 9 and made to be linear diffracted light by the deflection/diffraction grating 7. The diffracted light is passed through the rise-up mirror 5 and the collimating lens 4, reflected again by the wavelength filter 3, and thereafter received by light receiving elements 17 provided in the laser module 2 so as to be converted into electric signals.

The wavelength filter in this embodiment is designed to have a filter function from transmission to reflection between the wavelength of 650 nm and the wavelength of 410 nm so as to transmit the wavelengths of 780 nm and 650 nm and reflect the wavelength of 410 nm. The positions of the first and second laser modules 1 and 2 may be reversed. In that case, the wavelength filter will be designed to have a filter function from transmission to reflection between the wavelength of 410 nm and the wavelength of 650 nm so as to transmit the wavelength of 410 nm and reflect the wavelengths of 780 nm and 650 nm.

Figure 3:
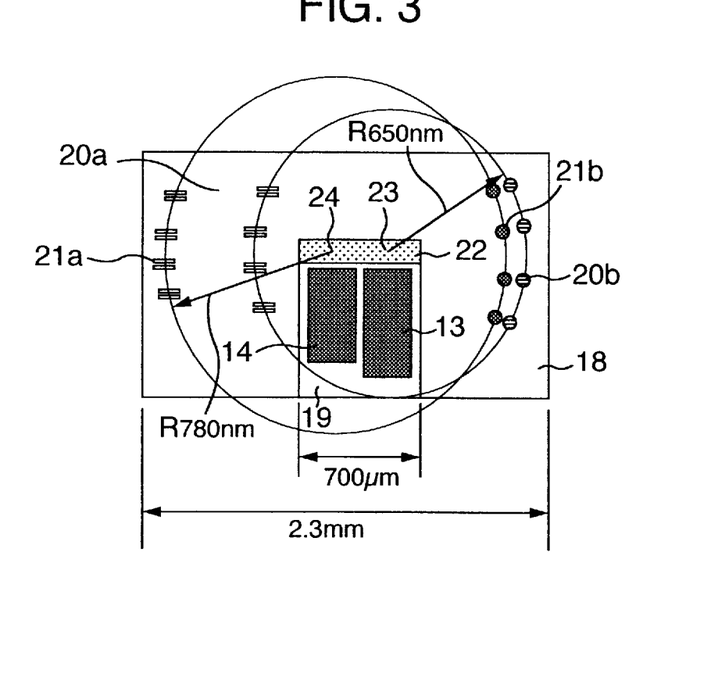
FIG. 3 is a plan view showing an embodiment of a two-laser module according to the present invention.

FIG. 3 shows an embodiment of the first laser module 1 shown in FIGS. 1 and 2. A sink portion 19 is formed on a silicon substrate 18. In the sink portion 19, a 650 nm wavelength laser light source 13 and a 780 nm wavelength laser light source 14 are pasted in parallel. Focusing and tracking light receiving elements corresponding to the respective lasers are disposed on opposite sides of the sink portion 19. In this embodiment, the tracking and signal-detecting light receiving elements are disposed on the left side of the sink portion 19. The wavelength of 650 nm is detected at four places represented by the reference numerals 20a while the wavelength of 780 nm is detected at four places represented by the reference numerals 21a. On the other hand, the focus-detecting light receiving elements are disposed on the right side of the sink portion 19. The wavelength of 650 nm is detected at four places represented by the reference numerals 20b while the wavelength of 780 nm is detected at four places represented by the reference numerals 21b. Then, a knife-edge method and a differential phase detection method are used for focus detecting and tracking respectively.

Light emitted from each laser is reflected by a micro-mirror 22 using a slope of a recess portion, rises perpendicularly to the silicon substrate 18, and travels toward the above-mentioned condensing optics. This point where the laser light rises is referred to as "apparent light-emission point" 23, 24. A distance R between the "apparent light-emission point" and each photodetector has the following relational expression.

$$R = (Fc \cdot \lambda)/p \qquad (1)$$

Where, Fc designates a focal length of a collimating lens; $\lambda$, a semiconductor laser wavelength; and p, a deflection/diffraction grating pitch.

This expression means that, if the focal length of the collimating lens and the pitch of the deflection/diffraction grating are determined, the shorter the wavelength is, the smaller the distance R between the "apparent light-emission point" and the photodetector is. On the other hand, this distance R is restricted by the width of the sink portion which is 700 μm. Taking into account a margin for disposing the photodetector, 800 μm or more is necessary for the distance R. In this embodiment, the focal length of the collimating lens is 20 nm. It is therefore necessary to set the deflection/diffraction grating pitch p to be 16 μm in order to set a distance R650 between the apparent light-emission point 23 for the 650 nm wavelength laser light and the focus-detecting photodetector portion 20a or the tracking and signal-detecting photodetector 20b to be 800 μm. Then, a distance R780 between the apparent light-emission point 24 for the 780 nm wavelength laser light and the focus-detecting photodetector portion 21a or the tracking and signal-detecting photodetector 21b becomes 975 μm. The sum of 800 μm for the distance R650, 975 μm for the distance R780, 300 μm for the distance between the apparent light-emission points 23 and 24 for the 650 nm wavelength laser light and the 780 nm wavelength laser light, and 225 μm for the margin at the silicon substrate ends is about 2.3 mm, which is the width of the silicon substrate 18.

Figure 4:
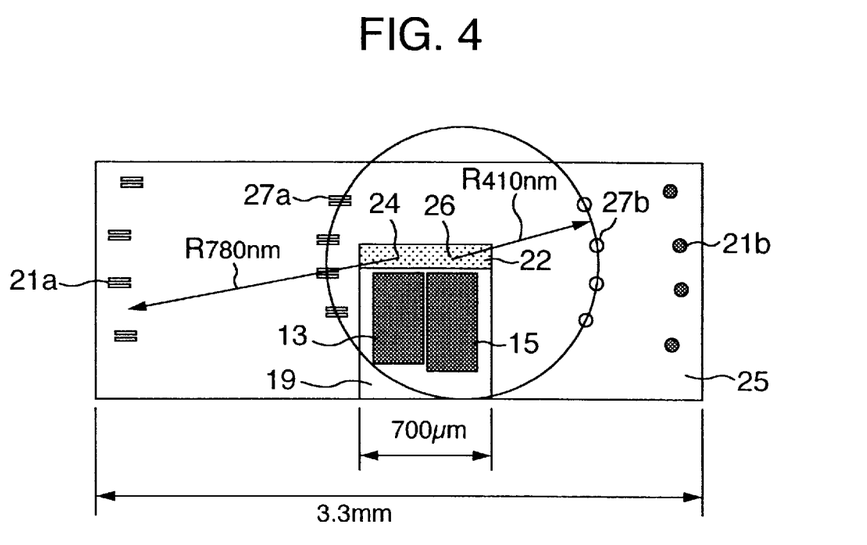
FIG. 4 is a plan view showing an embodiment of a two-laser module having wavelengths of 410 nm and 780 nm.

On the other hand, FIG. 4 shows a silicon substrate 25 on which a 410 nm wavelength laser light source 15 and a 780 nm wavelength laser light source 13 are mounted. In this embodiment, a distance R410 between an apparent light-emission point 26 for the 410 nm wavelength and a focus-detecting photodetector portion 27a or a tracking and signal-detecting photodetector 27b is restricted by the above-mentioned sink width so as to need to be 800 μm. As a result, the deflection/diffraction grating pitch (p) is 10 μm. Then, the distance R780 reaches 1,560 μm. The sum of 3,120 μm (1,560×2) for the distance between the focus-detecting photodetector portion 21a and the tracking and signal-detecting photodetector 21a for the 780 nm wavelength and 225 μm for the margin is about 3.3 mm, which is required for the width of a photodetector substrate 15. This width is about 1.5 times as large as that in FIG. 3. Accordingly, the photodetector substrate is increased in size, so that the increase of the cost cannot be bypassed.

Incidentally, as mentioned above, in the case of a three-laser module, the width of the photodetector substrate reaches 3.9 mm on similar conditions. It is inevitable to increase the cost due to the increased size of the photodetector substrate.

Therefore, if the merit on the cost is taken into consideration, the combination of a two-laser module and a one-laser module can miniaturize the photodetector substrate, and contribute to the reduction of the cost. To say other words, mounting laser chips having two adjacent wavelengths on one and the same laser module can miniaturize the photodetector substrate, and can contribute to the reduction of the cost.

Figure 6:
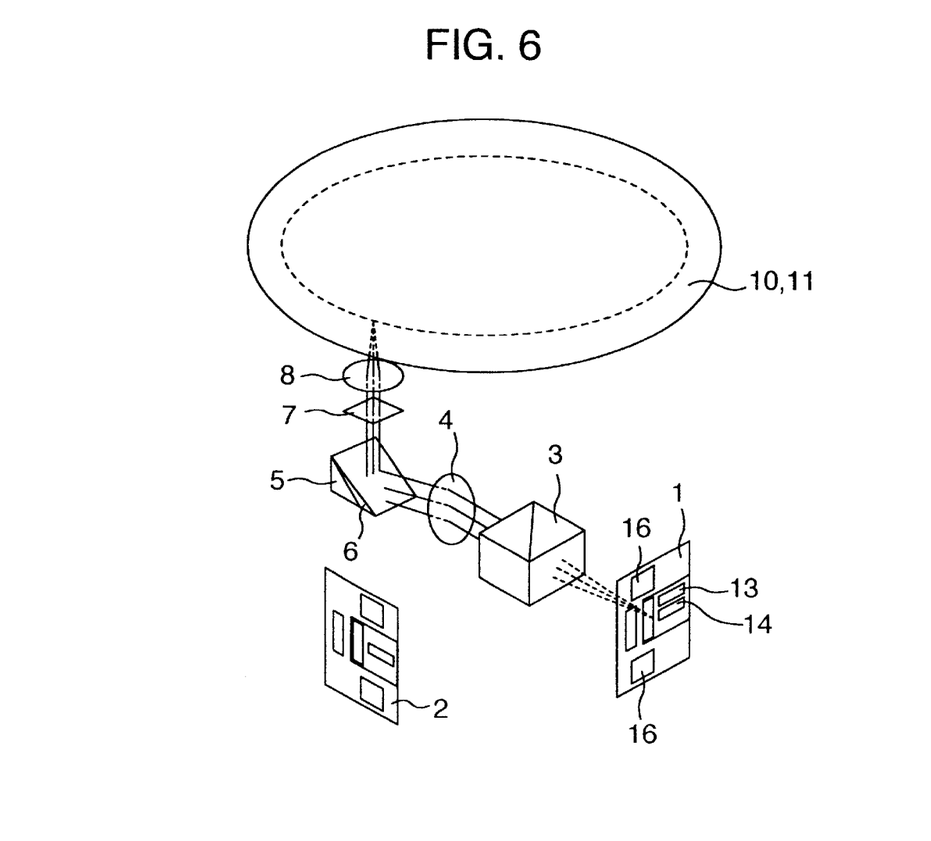
FIG. 6 is a view showing a second configuration example of an optical head according to the present invention.

FIG. 6 shows a second modification example of an optical head according to the present invention. A dichroic mirror 6 is bonded with the rise-up mirror 5 in FIG. 1 so as to correct the optical axes of the two semiconductor laser chips of the first laser module.

That is, the distance between the 650 nm wavelength laser light source 13 and the 780 nm wavelength laser light source 14 is 0.3 mm in the first laser module 1. Accordingly, when the 650 nm wavelength laser light is matched with the optical axis of the above-mentioned condensing optics, the 780 nm wavelength laser light is out of the optical axis, and incident obliquely on the condensing optics. This oblique incidence needs to be corrected because it causes coma aberration.

As means for this correction, the dichroic mirror 6 is bonded with the rise-up mirror 5 so that the 410 nm and 650 nm wavelengths are reflected by the dichroic mirror 6 while the 780 nm wavelength is transmitted through the dichroic mirror 6 and reflected by the rise-up mirror 5. Since the focal length (Fc) of the collimating lens is 20 mm, and the distance between two laser chips is 0.3 mm, the angle of the oblique incidence is $\tan^{-1}$ (0.3/20)=0.86°. Then, if the angle of the surface of the rise-up mirror 5 is tilted by 0.46° relatively to the surface of the dichroic mirror 6, the 780 nm wavelength laser light and the 650 nm wavelength laser light have the same optical axis.

When the optical head is used for high-density DVD, laser light emitted from the 410 nm wavelength semiconductor laser chip 15 in the second laser module 2 is reflected by the wavelength filter 3. Then, the reflected light takes the same optical axis as that of DVD laser light. The light is passed through the collimating lens 4, reflected by the dichroic mirror 6 bonded with the rise-up mirror 5, and thereafter condensed on the recording surface of the high-density DVD optical disc 12 by the special focus lens 9. Thus, in the embodiment of FIG. 6, the optical axes of the three wavelengths can be matched with one another so that coma aberration can be prevented from occurring.

Figure 7:
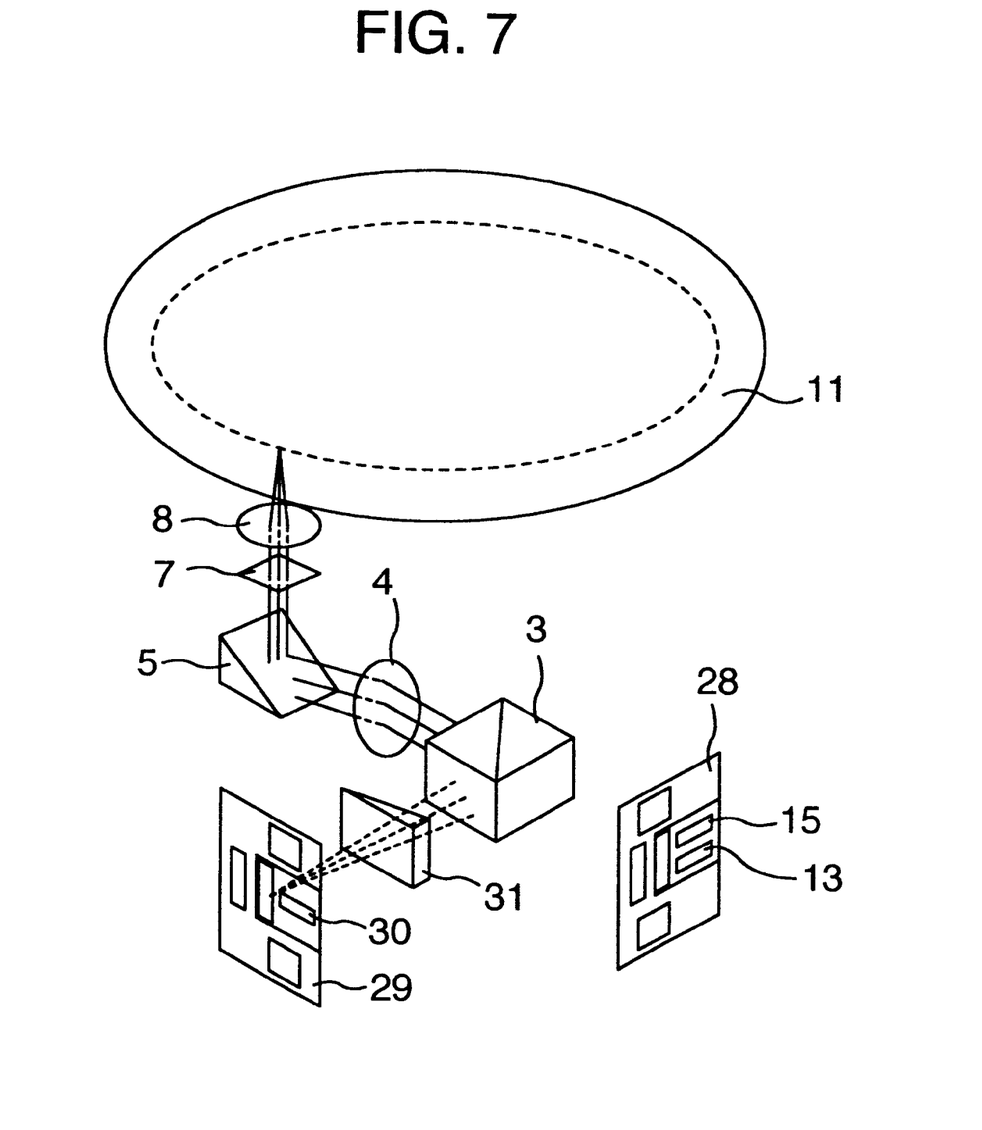
FIG. 7 is a view showing a third configuration example of an optical head according to the present invention.

Incidentally, it is said that the laser power required for recording on an optical disc is 30 mW for CD-R and 15 mW for DVD-RAM. CD-R needs twice as high power as DVD. On the other hand, in the focus lens 8 which is compatible with DVD and CD-R, NA (Numerical Aperture) for DVD is about 0.6, and NA for CD-R is about 0.5. The light receiving area for CD-R is smaller by about 20%. Therefore, a trend to make the power of a laser for CD-R high enough to deal with this situation has become strong, but the attempt to make the power of the laser itself high will come to its limit soon. It is therefore necessary to improve the use efficiency of laser light by use of beam shaping. FIG. 7 shows a third configuration example suitable for such a use.

In FIG. 7, a third laser module has a 650 nm wavelength semiconductor laser chip 13 for DVD-ROM or DVD-RAM, a 410 nm wavelength semiconductor laser chip 15 for high-density DVD, and photodetectors corresponding to those laser chips 13 and 15. On the other hand, a fourth laser module 29 has a 780 nm wavelength semiconductor laser chip 30 for CD-R and light receiving elements corresponding to the laser chip 30. A beam shaping prism 31 is disposed between the fourth laser module 29 and a wavelength filter 3. Thus, an elliptic light beam emitted from the 780 nm wavelength semiconductor laser chip 30 for CD-R, for example, with the horizontal emission angle about 10° and the vertical emission angle about 30° by half value total angle, is shaped into a circle so that the efficiency of incidence to the focus lens 8 is improved. As a result, it is possible to restrict making the CD-R semiconductor laser chip 30 have high power causing its temperature increase. In addition, a heat sink structure for preventing the semiconductor laser chip 30 from heating is simplified so that the improvement of the reliability and the reduction of the cost are realized in the optical head as a whole. The third configuration example using beam shaping is not limited to CD-R, and it is also applicable for improving the efficiency of incidence of the 410 nm wavelength laser for high-density DVD having a problem in how to make the laser have high power.

Although this configuration example was described with the 650 nm wavelength for DVD-ROM or DVD-RAM, the 780 nm wavelength for CD or CD-R and the 410 nm wavelength for high density DVD, the present invention is not limited to the wavelengths of 650 nm, 780 nm and 410 nm. For example, it is apparent that the present invention is also applicable to the case of values of 650±10 nm, 780±10 nm, and 410±10 nm.

Figure 8:
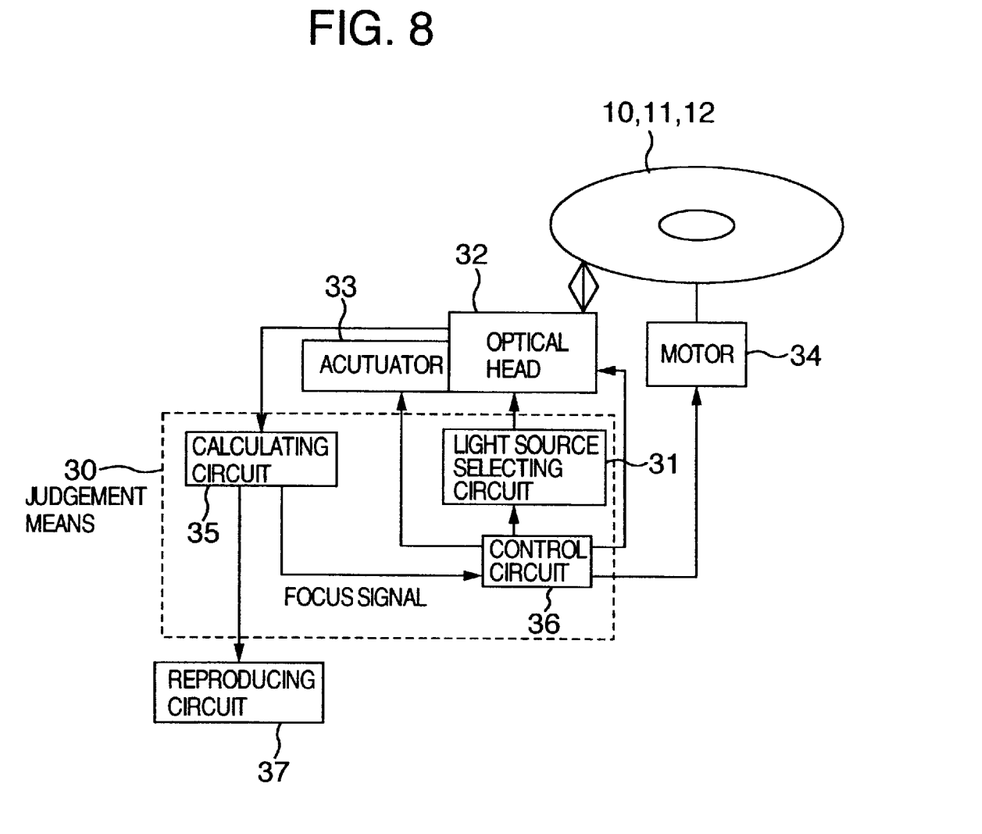
FIG. 8 is a view showing a structure for judging optical disk in an optical information recording apparatus according to the present invention.

As an optical information recording apparatus, as shown in FIG. 8, judgement means 30 including control circuit 36, light source selecting circuit 36 and calculating circuit 35 for judging whether the sort of disc is CD, DVD or high density DVD is provided. Also in this structure as shown in FIG. 8, motor 34, optical head 32, actuator 33 and reproducing circuit 37 are included. On the basis of the judgement result, a corresponding one is selected from lasers having wavelengths of 780 nm, 650 nm and 410 nm by use of laser light source selection means. Thus, the best light source is made to emit light so as to record/reproduce information.

As described above in detail, according to this configuration example, in an optical head for recording/reproducing optical information recording media having three wavelengths, a silicon substrate for forming photodetectors mounted on a two-laser module can be miniaturized. In addition, optical axes of laser lights of the three wavelengths are matched with one another by a condensing optics so that coma aberration can be prevented from occurring. Further, it is possible to restrict making a semiconductor laser chip for recording on CD-R or the like have high power. Thus, the optical head contributes to the reduction of the cost and the improvement of the reliability.

According to the present invention, it is possible to miniaturize a two-laser module, and it is possible to realize an optical head suitable for high-power recording on CD-R or the like. Thus, the present invention contributes to the reduction of the cost and the improvement of the reliability.

What is claimed is:

1. An optical head comprising a plurality of laser light sources and a plurality of photodetectors corresponding to said plurality of laser light sources, wherein said plurality of laser light sources have three kinds of wavelengths A, B and C (A>B>C), and include first and second laser modules, said first laser module including laser light sources having the wavelengths A and B and two photodetectors corresponding to said laser light sources having the wavelengths A and B, said second laser module including a laser light source having the wavelength C and a photodetector corresponding to said laser light source having the wavelength C, wherein laser light emitted from each laser light source of said first laser module is introduced to an optical information medium through a wavelength filter, reflected light from said optical information medium is introduced to said photodetectors of said first laser module, and wherein laser light emitted from said laser light source of said second laser module is introduced to said optical information medium through said wavelength filter, reflected light from said optical information medium is introduced to said photodetector of said second laser module.

2. An optical head according to claim 1, wherein a collimating lens, a rise-up mirror and a focus lens are provided as focusing means between said wavelength filter and said optical information medium, and a dichroic mirror is put on a surface of said rise-up mirror, and wherein light of the wavelength A is transmitted through said dichroic mirror and reflected by a surface of said rise-up mirror, while light of the wavelength B is reflected by said dichroic mirror.

3. An optical head according to claim 2, wherein a beam shaping prism is disposed between said second laser module and said wavelength filter.

4. An optical head comprising a plurality of laser light sources and a plurality of photodetectors corresponding to said plurality of laser light sources, wherein said plurality of laser light sources have three kinds of wavelengths A, B and C (A>B>C), and include first and second laser modules, said first laser module including laser light sources having the wavelengths B and C and two photodetectors corresponding to said laser light sources having the wavelengths B and C, said second laser module including a laser light source having the wavelength A and a photodetector corresponding to said laser light source having the wavelength A, wherein laser light emitted from each laser light source of said first laser module is introduced to an optical information medium through a wavelength filter, reflected light from said optical information medium is introduced to said photodetectors of said first laser module, and wherein laser light emitted from said laser light source of said second laser module is introduced to an optical information medium through said wavelength filter, reflected light from said optical information medium is introduced to said photodetector of said second laser module.

5. An optical head according to claim 4, wherein a collimating lens, a rise-up mirror and a focus lens are provided as focusing means between said wavelength filter and said optical information medium, and wherein a dichroic mirror is put on a surface of said rise-up mirror, light of the wavelength B is transmitted through said dichroic mirror and reflected by a surface of said rise-up mirror, while light of the wavelength C is reflected by said dichroic mirror.

6. An optical head according to claim 5, wherein a beam shaping prism is disposed between said second laser module and said wavelength filter.

7. An optical information recording and reproducing apparatus for recording information on an optical information medium or reproducing information recorded thereon, comprising:

an optical head constituted by first and second laser modules and a wavelength filter, said first laser module including laser light sources having wavelengths A and B (A>B) and including two light receiving elements corresponding to said laser light sources having the wavelengths A and B, said second laser module including a laser light source having a wavelength C (B>C) and including a photodetector corresponding to said laser light source having the wavelength C, said wavelength filter being configured to introduce laser light emitted from one of laser light sources of said first and second laser modules to an optical information medium, and introduce reflected light from said optical information medium to corresponding one of said photodetectors of said first and second laser modules;

judgement means for judging the sort of said optical information medium; and selection means for selecting one of said laser light sources;

wherein said one of said laser light sources is selected by said selection means on the basis of a result of judgement of said judgement means, and said first or second laser module having said selected one laser light source is used, so that information is recorded on said optical information medium or information recorded thereon is reproduced.

8. An optical information recording and reproducing apparatus for recording information on an optical information medium or reproducing information recorded thereon, comprising:

an optical head constituted by first and second laser modules and a wavelength filter, said first laser module including laser light sources having wavelengths B and C (B>C) and including two photodetectors corresponding to said laser light sources having the wavelengths B and C, said second laser module including a laser light source having a wavelength A (A>B) and including a photodetector corresponding to said laser light source having the wavelength A, said wavelength filter being configured to introduce laser light emitted from one of laser light sources of said first and second laser modules to an optical information medium, and introduce reflected light from said optical information medium to corresponding one of said photodetectors of said first and second laser modules;

judgement means for judging the sort of said optical information medium; and selection means for selecting one of said laser light sources;

wherein said one of said laser light sources is selected by said selection means on the basis of a result of judgement of said judgement means, and said first or second laser module having said selected one laser light source is used, so that information is recorded on said optical information medium or information recorded thereon is reproduced.

* * * * *